July 13, 1954
D. A. McCAULAY ET AL
2,683,759
ETHYLBENZENE DISPROPORTIONATION
Filed Jan. 30, 1952
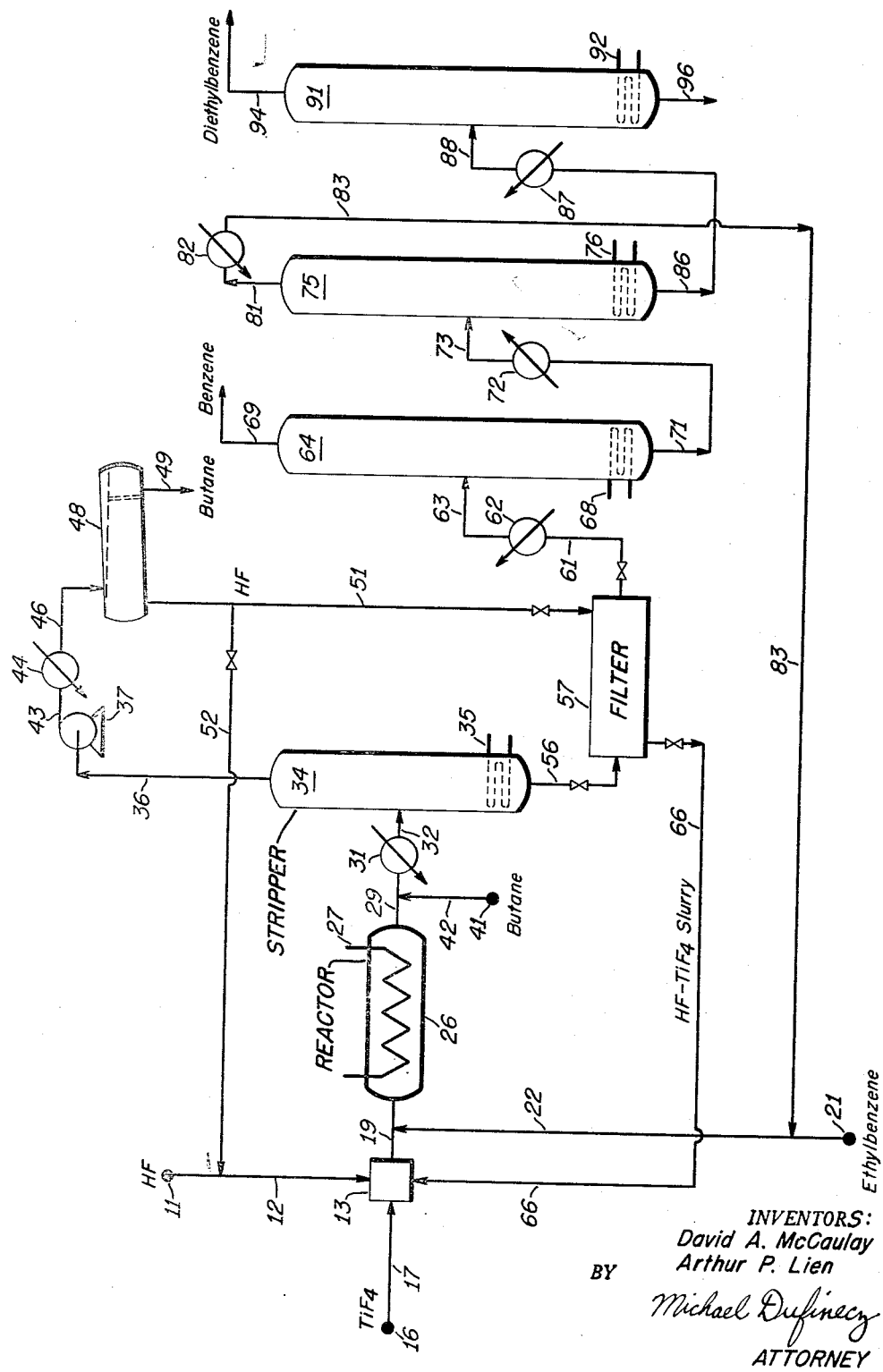
INVENTORS:
David A. McCaulay
Arthur P. Lien
BY
Michael Dufinecz
ATTORNEY

UNITED STATES PATENT OFFICE 2,683,759

ETHYLBENZENE DISPROPORTIONATION

David A. McCaulay, Chicago, Ill., and Arthur P. Lien, Highland, Ind., assignors to Standard Oil Company, Chicago, Ill., a corporation of Indiana Application January 30, 1952, Serial No. 269,084

6 Claims. (Cl. 260—671)

This invention relates to a process for the disproportionation of ethylbenzene to produce benzene and $C_{10}$ aromatic hydrocarbons. More particularly, this invention is concerned with a process for the conversion of ethylbenzene in high yields to meta-diethylbenzene.

It is well known in the art that Friedel-Crafts catalysts will activate the disproportionation of ethylbenzene. However, it is also known that when catalysts of this type are used the equilibrium for the reaction,

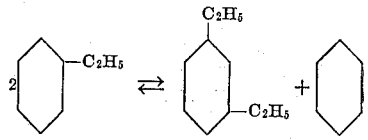

is displaced to the left, so that when appreciable quantities of benzene are produced or present, very little diethylbenzene is formed. This is illustrated by an experiment in which 3.0 mols of benzene and 1.5 mols of diethylbenzene were maintained at 205–210° F. for 3.0 hours in the presence of $AlCl_3$. The original diethylbenzene was more than half converted to ethylbenzene in this experiment.

One object of our invention is to provide a process for the disproportionation of ethylbenzene. Another object of our invention is to provide a process for the preparation of meta-diethylbenzene. Still another object of our invention is to provide a process for the preparation of meta-diethylbenzene wherein the catalyst functions also as a solvent for the meta-diethylbenzene. These and other objects of our invention will become apparent from the ensuing description thereof.

We have found that ethylbenzene can be disproportionated in the presence of liquid hydrogen fluoride and $TiF_4$ in accordance with the following equation:

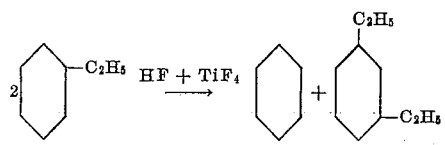

and that the meta-diethylbenzene is present in the liquid hydrogen fluoride-acid phase in the form of a complex with $TiF_4$; the benzene produced in the reaction and the unreacted ethylbenzene do not form a complex with the $TiF_4$-HF treating agent.

Through the proper use of the $TiF_4$-liquid HF treating agent, we can obtain a very rapid reaction at ordinary atmospheric temperatures and are able to shift the thermodynamic equilibrium, depicted above, to effect a substantially quantitative conversion of ethylbenzene into meta-diethylbenzene and benzene. This shift in the thermodynamic equilibrium can be explained upon the basis that meta-diethylbenzene selectively complexes with HF and $TiF_4$, causing the ethylbenzene disproportionation equilibrium to be shifted to the right. In more precise language the equilibrium constant for the reaction among the complexed aromatics is many hundred times greater than the equilibrium constant for the reaction among the uncomplexed aromatics. The diethylbenzene-HF-$TiF_4$ complex appears to contain 2 mols of $TiF_4$ and (at least) 1 mol of HF for each mol of diethylbenzene.

Titanium tetrafluoride is a crystalline solid having a boiling point of 543° F. The solid is only slightly soluble in liquid HF. The solubility of $TiF_4$ in liquid HF is enormously increased when diethylbenzene is brought into contact with the $TiF_4$, in the presence of liquid HF; for example, a slurry of $TiF_4$ and liquid HF is rapidly converted to a clear reddish liquid when the slurry is contacted with a sufficient amount of diethylbenzene.

In the ethylbenzene disproportionation reaction we employ at least about 0.5 mol of $TiF_4$ per mol of ethylbenzene in the charging stock. If less than about 1 mol of $TiF_4$ is used, substantially quantitative conversion of the ethylbenzene will not be attained, so that we prefer to use approximately 1 mol of $TiF_4$ per mol of ethylbenzene in the charging stock. More than 1 mol of $TiF_4$ per mol of ethylbenzene may be employed if desired, for example, as much as 4 mols. In general, the use of more than about 2 mols of $TiF_4$ per mol of ethylbenzene is undesirable because appreciable amounts of triethylbenzene are formed with a large excess of $TiF_4$ present. The amount of side reactants produced appears to be dependent upon the amount of undissolved $TiF_4$, i. e., $TiF_4$ which is not in the complexed state, in the treating zone.

The liquid HF used in this process should be substantially anhydrous, i. e., the HF should contain not more than about 1 or 2% of water. Sufficient liquid HF must be present in the treating zone to participate in the formation of the complex. More than this minimum amount is desirable, particularly when an inert hydrocarbon is present—in this case enough liquid HF should be present to form a separate acid phase. The amount of liquid HF used may vary from between about 5 and about 500 volume percent based on the charging stock. However, we prefer to use between about 50 and about 300 volume percent of liquid HF.

The temperature of treatment is of considerable importance in our process because the liquid HF-$TiF_4$ treating agent is a very powerful catalyst for reactions other than the desired ethylbenzene disproportionation. In order to avoid side reactions due to other catalytic effects the temperature of contacting should be below about 175° F. Temperatures below 0° F. may be used when the correspondingly increased contacting time necessary to attain the desired degree of conversion can be tolerated. We prefer to carry out the disproportionation reaction at a temperature between about 50° and 125° F.

The time of contact between the ethylbenzene and the treating agent has some effect on the degree of conversion of the ethylbenzene. The contacting time to obtain maximum conversion is dependent upon the degree of agitation and also upon the temperature of the treating zone. In general the higher the temperature the shorter the contact time. The contacting time may vary from as little as 1 minute to 6 or more hours, dependent upon the temperature in the treating zone. When operating in the preferred temperature range, i. e., from about 50° to about 125° F., the contacting time may be between about 1 minute and 30 minutes.

The disproportionation reaction may be effected in the presence of inert hydrocarbons, e. g., saturated hydrocarbons, such as, butane, pentanes, hexanes, octanes, cyclopentane, methylcyclopentane, dimethylcyclopentane, hexane, methylcyclohexane, saturated naphthas and the like; these are essentially insoluble in the liquid hydrogen fluoride-$TiF_4$ employed as the treating agent and as the solvent medium for the $C_{10}$ aromatic hydrocarbons produced in the disproportionation of ethylbenzene. Benzene and toluene are substantially insoluble in our treating agent, the presence of complex increases the solubility of benzene and toluene in the acid phase; nevertheless, by using large amounts, these hydrocarbons may be employed as diluents. We have found that the presence of large amounts of diluent hydrocarbons has an adverse effect on the degree of conversion of the ethylbenzene. We prefer to operate without diluent in the charging stock, i. e., we prefer to use high purity ethylbenzene as the feed.

In order to illustrate the results obtainable with our process, the following examples are given. In all cases the contacting was carried out in a carbon steel reactor equipped with a 1725 R. P. M. stirrer. The experimental procedure was to add a qauntity of $TiF_4$ to the vessel followed by liquid HF and then by the ethylbenzene feed. The contents of the vessel were stirred for a selected time, usually about 30 minutes, at the selected temperature. At the end of the contacting time the contents of the vessel were withdrawn into a container full of cracked ice. The upper hydrocarbon layer was separated from the lower aqueous layer. The hydrocarbon layer was washed with dilute aqueous caustic to eliminate traces of HF. The hydrocarbon was carefully fractionated into narrow boiling cuts. These cuts were analyzed by the usual methods and also by ultraviolet absorption methods.

RUN 1

In this run 388 g.—3.2 mols—of $TiF_4$ were added to the reaction vessel; then 500 ml. of liquid HF—25 mols—were added. Finally 100 ml.—0.8 mol—of ethylbenzene were added to the vessel. This represents 4 mols of $TiF_4$ per mol of ethylbenzene charged. The contents in the vessel were agitated for 30 minutes at a temperature of 63° F. The contents of the reactor were withdrawn into a vessel containing cracked ice. Under these conditions, the benzene and ethylbenzene were completely solubilized and only one liquid phase was present in the vessel. In order to recover all the material in the reaction vessel, it was necessary to wash out the vessel with water as the excess undissolved $TiF_4$ and hydrocarbons had adhered to the walls of the vessel. The oil was analyzed and found to consist of:

Composition, mol percent

Benzene _____ 34.2
Ethylbenzene _____ 9.7
1,3-diethylbenzene _____ 42.4
1,3,5-triethylbenzene _____ 13.7

The diethylbenzene had inspections corresponding to those given by API project 45 data for 1,3-diethylbenzene. The ultraviolet spectrum of our product was identical with that of 1,3-diethylbenzene.

RUN 2

In this run the liquid HF and $TiF_4$ usage was the same as that in Run 1. The ethylbenzene added amounted to 200 ml.—1.6 mols. Thus the ratio of $TiF_4$ to ethylbenzene was 2.0. The contents were agitated for 30 minutes at a temperature of 64° F. The vessel had to be washed out with water in order to remove undissolved $TiF_4$ which had adhered to the walls of the vessel. The oil recovered was analyzed and found to consist of:

Composition, mol percent

Benzene _____ 31.8
Ethylbenzene _____ 17.2
1,3-diethylbenzene _____ 48.3
1,3,5-triethylbenzene _____ 2.7

The comparison of the two runs shows a fivefold greater amount of triethylbenzene produced in Run 1 over Run 2. It is our opinion that this large increase results from the very large excess of $TiF_4$ present in Run 1. We think that the hydrocarbons adsorbed on the suface of the solid $TiF_4$ were converted to the triethylbenzene to a much greater extent than the hydrocarbons in the acid phase.

The diethylbenzene produced is substantially one isomer, namely meta-diethylbenzene, which is valuable as a pure chemical and especially valuable as a motor fuel component, as will appear from the following table from which its octane number is compared with that of ethylbenzene.

|  | CFR-R Octane No. | |
| --- | --- | --- |
|  | Clear | Blending |
| 1,3-diethylbenzene | Isooctane+3 cc. TEL | 155 |
| Ethylbenzene | Isooctane+0.8 cc. TEL | 124 |

Meta-diethylbenzene has the highest known CFR-R blending octane number of any dialkylbenzene. It is obvious, also, that meta-diethylbenzene can be used as a component of "safety fuel."

The figure illustrates a large scale embodiment of our process wherein the feed is a high purity ethylbenzene.

Liquid HF from source 11 is passed through line 12 into vessel 13, which vessel 13 is provided with agitating means not shown. Finely divided $TiF_4$ from storage 16 is passed by way of line 17 into vessel 13. Many methods are known in the art for introducing a finely divided solid into a line and conveying the material into a closed vessel; e. g., storage 16 may be equipped with a star valve at the exit thereof and line 17 may be equipped with conveying flights for propelling the solid. In vessel 13, the liquid HF and the $TiF_4$ form a slurry—when, as is usually the case, more $TiF_4$ is used than is soluble in the liquid HF—which slurry is passed into line 19. Another method of introducing the $TiF_4$ into the system, is to add $TiCl_4$—a liquid—into vessel 13 where the chloride reacts with HF to produce $TiF_4$; extra HF must be added to vessel 13 to participate in the reaction. When using $TiCl_4$, vessel 13 should be provided with means for venting the HCl formed. A high purity ethylbenzene, i. e., containing less than about 5% of xylenes, is introduced into line 19 from source 21 by way of line 22.

In order to reduce the amount of solid $TiF_4$ present in the system beyond line 19, and to minimize the production of triethylbenzene in this illustration, we use 1 mol of $TiF_4$ per mol of ethylbenzene present in the feed. The amount of liquid HF added, in this illustration, is 200 volume percent, based on ethylbenzene in the feed.

The commingled stream is passed from line 19 into reactor 26 which is provided with a coil 27 and with agitating means not shown. The coil 27 is used to maintain the contents of the reactor at the desired reaction temperature, in this illustration 75° F. The reaction mixture is held for a time sufficient to attain substantially complete conversion of the ethylbenzene, but not in any great excess of that time in order to avoid undesirable side reactions. A suitable reaction time at 75° F. is about 15 minutes. It is to be understood that sufficient pressure must be maintained in vessel 13 and reactor 26 to keep the HF in the liquid state. From reactor 26 the materials pass through line 29, heat exchanger 31 and the line 32 into stripper 34, which stripper is equipped with heater 35. However, when operating at temperatures in the neighborhood of 125° F., it is desirable to cool quickly the reaction mixture to less than 100° F. in order to decrease the formation of undesirable by-products and cracking.

In stripper 34 the HF is removed from the reaction mixture by way of line 36 under vacuum provided by vacuum pump 37. The stripping may be facilitated by the introduction of a stripping agent, such as butane. While the stripping agent may be introduced directly into stripper 34, we prefer to utilize the stripping material as a cooling medium and therefore introduce butane from source 41 by way of line 42 into line 29. When a stripping agent is used, stripper 34 is operated in such a way that both the stripping agent and HF are taken overhead through line 36. The HF and butane vapors pass through line 36, vacuum pump 37, line 43, condenser 44 and line 46 into settler 48. The butane and HF are condensed in condenser 44 and the two liquids are separated in settler 48. The butane passes out of settler 48 through line 49 and is recycled to line 42 for reuse in the process. The liquid HF passes out of settler 48 through line 51 and may be recycled to vessel 13 by way of valved line 52 and line 12.

With the removal of the HF, the diethylbenzene-$TiF_4$ complex decomposes and the bottom of stripper 34 contains liquid hydrocarbons and solid, finely divided $TiF_4$ precipitate. These are withdrawn from stripper 34 through valved line 56 and are passed into filter 57. Filter 57 may be any type of HF-resistant and HF-vapor tight filter, such as, a plate and frame filter, or a rotary filter. A centrifuge may be used for this separation also. We prefer to use a Sweetland-type filter. The $TiF_4$ is retained in the filter and the liquid is passed through valved line 61, heater 62 and line 63 into fractionator 64.

The $TiF_4$ is removed from filter 57 by means of a backwashing operation with liquid HF from valved line 51. The slurry of liquid HF and $TiF_4$ is passed from filter 57 through valved line 66 to vessel 13 for reuse in the process. It is to be understood that even though we show only one filter, for continuous operation two or more filters would be used.

Fractionator 64 is provided with a reboiler 68. A substantially pure benzene fraction is taken overhead from fractionator 64 through line 69 and is passed to storage not shown. A mixture of unconverted ethylbenzene, meta-diethylbenzene and triethylbenzene is withdrawn from the bottom of fractionator 64 by way of line 71.

The contents of line 71 are passed through heater 72 and line 73 into fractionator 75, which fractionator is provided with a reboiler 76. An overhead fraction of ethylbenzene passes out of fractionator 75 through line 81, condenser 82 and is recycled to the process by way of lines 83 and 22.

A bottoms fraction of meta-diethylbenzene and triethylbenzene is withdrawn from fractionator 75 by way of line 86. This fraction is passed through line 86, heater 87 and line 88 into fractionator 91, which fractionator is provided with reboiler 92. Substantially pure meta-diethylbenzene is taken overhead from fractionator 91 through line 94 and is passed to storage not shown. A by-product fraction of triethylbenzene and other impurities is withdrawn through line 96 and sent to storage not shown.

It is to be understood that the above described embodiment is shown for purposes of illustration only and that many other variations of our process can be readily devised by those skilled in the art.

This application is a continuation-in-part of our application Serial Number 258,918, filed November 29, 1951 and entitled "Refining of Hydrocarbon Oils with HF and $TiF_4$."

We claim:

1. A process for the disproportionation of ethylbenzene to produce meta-diethylbenzene in a quantity in substantial excess of the thermodynamic equilibrium quantity, which process comprises contacting ethylbenzene in the absence of other reactive hydrocarbons with at least about 5 volume percent of liquid hydrogen fluoride and with at least about 0.5 mol of $TiF_4$ per mol of ethylbenzene at a temperature between about 0° F. and about 175° F. under a pressure sufficient at least to maintain a liquid phase and separating meta-diethylbenzene from the reaction products.

2. A process for the disproportionation of ethylbenzene which comprises contacting ethylbenzene in the absence of other reactive hydrocarbons in a reaction zone with at least about 5 volume percent of liquid hydrogen fluoride and with at least about 0.5 mol of $TiF_4$ per mol of ethylbenzene at a temperature between about 0° F. and about 175° F. under a pressure sufficient at least to maintain a liquid phase, withdrawing at least a portion of the reaction mixture to a settling zone, withdrawing from said settling zone a solution comprising hydrogen fluoride, $TiF_4$ and meta-diethylbenzene, and recovering said meta-diethylbenzene from said solution.

3. The process of claim 2 wherein at least about 1 mol of $TiF_4$ is maintained in the reaction zone per mol of ethylbenzene charged.

4. A process for the disproportionation of ethylbenzene which comprises contacting ethylbenzene in the absence of other reactive hydrocarbons in a reaction zone with at least about 5 volume percent of liquid hydrogen fluoride and with at least about 0.5 mol of $TiF_4$ per mol of ethylbenzene at a temperature between about 0° F. and about 175° F. under a pressure sufficient at least to maintain a liquid phase and separating meta-diethylbenzene from the reaction products.

5. The process of claim 4 wherein at least about 1 mol of $TiF_4$ is maintained in the reaction zone per mol of ethylbenzene charged and the reaction temperature is between about 50° F. and about 125° F.

6. A process for the substantially quantitative disproportionation of ethylbenzene to produce benzene and meta-diethylbenzene to the substantial exclusion of other diethylbenzenes, which process comprises contacting ethylbenzene in the absence of other reactive hydrocarbons, with between about 50 and about 300 volume percent of liquid hydrogen fluoride and with between about 1 to 2 mols of $TiF_4$ per mol of ethylbenzene at a temperature between 50 and 125° F. under a pressure sufficient at least to maintain a liquid phase, allowing at least a portion of the reaction mixture to settle in a settling zone, withdrawing from said settling zone a liquid HF-rich phase and recovering meta-diethylbenzene from said phase.

References Cited in the file of this patent

UNITED STATES PATENTS

| Number | Name | Date |
|---|---|---|
| 2,425,559 | Passino | Aug. 12, 1947 |
| 2,514,866 | Hovey | July 11, 1950 |
| 2,528,893 | Lien et al. | Nov. 7, 1950 |